(12) United States Patent
Tomomatsu

(10) Patent No.: US 11,548,323 B2
(45) Date of Patent: Jan. 10, 2023

(54) PNEUMATIC TIRE

(71) Applicant: The Yokohama Rubber Co., LTD., Tokyo (JP)

(72) Inventor: Ryouichi Tomomatsu, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 0 days.

(21) Appl. No.: 17/257,128

(22) PCT Filed: Jul. 1, 2019

(86) PCT No.: PCT/JP2019/026016
§ 371 (c)(1),
(2) Date: Dec. 30, 2020

(87) PCT Pub. No.: WO2020/009049
PCT Pub. Date: Jan. 9, 2020

(65) Prior Publication Data
US 2021/0122195 A1    Apr. 29, 2021

(30) Foreign Application Priority Data

Jul. 2, 2018 (JP) .............................. JP2018-126058

(51) Int. Cl.
*B60C 11/13* (2006.01)
*B60C 11/03* (2006.01)
(Continued)

(52) U.S. Cl.
CPC .......... *B60C 11/13* (2013.01); *B60C 11/0302* (2013.01); *B60C 11/12* (2013.01);
(Continued)

(58) Field of Classification Search
CPC ....... B60C 11/13; B60C 11/12; B60C 11/042; B60C 11/0302; B60C 11/1376; B60C 2011/0346; B60C 11/0304
(Continued)

(56) References Cited

U.S. PATENT DOCUMENTS 10,150,337 B2   12/2018  Tada
2011/0024012 A1*  2/2011  Iwai ................... B60C 11/0309
                                                   152/209.27
(Continued)

FOREIGN PATENT DOCUMENTS

CN    103879236 A    6/2014
CN    105579250 A    5/2016
(Continued)

*Primary Examiner* — Katelyn W Smith
*Assistant Examiner* — Philip N Schwartz
(74) *Attorney, Agent, or Firm* — Thorpe North & Western

(57) ABSTRACT

Steering stability performance on dry road surfaces and steering stability performance on wet road surfaces are improved.
A land portion width Wcc of a center land portion (31) and a land portion width Wco of an outer side middle land portion (32) satisfy a relationship of Wcc<Wco. In addition, a ground contact surface (10) of each of the outer side middle land portion (32) and an outer side shoulder land portion (34) is formed to protrude toward an outer side in a tire radial direction with respect to a reference profile PRco, PRso, and a protruding amount Hco of the outer side middle land portion (32) and a protruding amount Hso of the outer side shoulder land portion (34) satisfy a relationship of Hco<Hso.

14 Claims, 7 Drawing Sheets

(51) Int. Cl.
 *B60C 11/12* (2006.01)
 *B60C 11/04* (2006.01)

(52) U.S. Cl.
 CPC ....... *B60C 11/1376* (2013.01); *B60C 11/0304* (2013.01); *B60C 11/042* (2013.01); *B60C 2011/0346* (2013.01)

(58) Field of Classification Search
 USPC ................ D12/523, 524, 555, 556, 590, 591
 See application file for complete search history.

(56) References Cited

U.S. PATENT DOCUMENTS

| | | | |
|---|---|---|---|
| 2013/0328240 A1* | 12/2013 | Takahashi | B29C 33/424 264/293 |
| 2014/0166169 A1* | 6/2014 | Tanaka | B60C 11/1376 152/209.15 |
| 2016/0009141 A1* | 1/2016 | Suga | B60C 11/04 152/209.9 |
| 2016/0280011 A1 | 9/2016 | Uchida | |
| 2017/0182849 A1 | 6/2017 | Uchida | |
| 2019/0193472 A1* | 6/2019 | Kubo | B60C 11/0083 |

FOREIGN PATENT DOCUMENTS

| | | |
|---|---|---|
| CN | 106061758 A | 10/2016 |
| DE | 10 2015 212 995 | 1/2016 |
| DE | 11 2014 005 018 | 8/2016 |
| EP | 2746066 A1 | 6/2014 |
| JP | 2013-189121 A | 9/2013 |
| JP | 2014-118123 A | 6/2014 |
| JP | 2016-002890 A | 1/2016 |
| JP | 2017-30635 A | 2/2017 |
| JP | 2017-61215 A | 3/2017 |
| JP | 2017-159752 A | 9/2017 |
| WO | 2015/064248 A1 | 5/2015 |
| WO | 2015/182449 A1 | 12/2015 |

* cited by examiner

|  |  | Conventional Example | Example 1 | Example 2 | Example 3 |
|---|---|---|---|---|---|
| Presence/ absence of protrusion on ground contact surface | Outer side shoulder land portion | No | Yes | Yes | Yes |
|  | Outer side middle land portion | No | Yes | Yes | Yes |
|  | Center land portion | No | No | No | No |
|  | Inner side middle land portion | No | No | No | No |
|  | Inner side shoulder land portion | No | No | No | No |
| Land portion width Wcc of center land portion < land portion width Wco of outer side middle land portion | | Same | Good | Good | Good |
| Protruding amount Hco of outer side middle land portion < protruding amount Hso of outer side shoulder land portion | | Same | Good | Good | Good |
| Protruding amount Hco of outer side middle land portion [mm] | | - | 0.1 | 0.2 | 0.4 |
| Protruding amount Hso of outer side shoulder land portion [mm] | | - | 0.25 | 0.3 | 0.6 |
| Protruding amount of outer side middle land portion and protruding amount of outer side shoulder land portion (Hso/Hco) | | - | 2.5 | 1.5 | 1.5 |
| Protruding amount of center land portion and protruding amount of outer side middle land portion (Hcc/Hco) | | - | 0.0 | 0.0 | 0.0 |
| Protruding amount of center land portion and protruding amount of inner side middle land portion (Hcc/Hci) | | - | 0.0 | 0.0 | 0.0 |
| Presence/absence of groove when ground contact surface of center land portion contacts ground | | Yes | Yes | Yes | Yes |
| Presence/absence of groove when ground contact surface of outer side middle land portion and inner side middle land portion contact ground | | Yes | Yes | Yes | Yes |
| Land portion width of center land portion and land portion width of outer side middle land portion (Wco/Wcc) | | 1.0 | 1.1 | 1.1 | 1.1 |
| Land portion width of center land portion and land portion width of outer side shoulder land portion (Wso/Wcc) | | 1.0 | 1.0 | 1.0 | 1.0 |
| Land portion width of center land portion and land portion width of inner side middle land portion (Wci/Wcc) | | 1.0 | 1.0 | 1.0 | 1.0 |
| Land portion width of center land portion and land portion width of inner side shoulder land portion (Wsi/Wcc) | | 1.0 | 1.0 | 1.0 | 1.0 |
| Protruding amount of outer side shoulder land portion and protruding amount of inner side shoulder land portion (Hso/His) | | - | 0.0 | 0.0 | 0.0 |
| Steering stability performance on dry road surfaces | | 100 | 101 | 102 | 103 |
| Steering stability performance on wet road surfaces | | 100 | 101 | 101 | 102 |

FIG. 4A

|  |  | Example 4 | Example 5 | Example 6 | Example 7 |
|---|---|---|---|---|---|
| Presence/absence of protrusion on ground contact surface | Outer side shoulder land portion | Yes | Yes | Yes | Yes |
|  | Outer side middle land portion | Yes | Yes | Yes | Yes |
|  | Center land portion | No | No | Yes | Yes |
|  | Inner side middle land portion | No | No | Yes | Yes |
|  | Inner side shoulder land portion | No | No | No | No |
| Land portion width Wcc of center land portion < land portion width Wco of outer side middle land portion | | Good | Good | Good | Good |
| Protruding amount Hco of outer side middle land portion < protruding amount Hso of outer side shoulder land portion | | Good | Good | Good | Good |
| Protruding amount Hco of outer side middle land portion [mm] | | 0.3 | 0.3 | 0.3 | 0.3 |
| Protruding amount Hso of outer side shoulder land portion [mm] | | 0.36 | 0.6 | 0.45 | 0.45 |
| Protruding amount of outer side middle land portion and protruding amount of outer side shoulder land portion (Hso/Hco) | | 1.2 | 2.0 | 1.5 | 1.5 |
| Protruding amount of center land portion and protruding amount of outer side middle land portion (Hcc/Hco) | | 0.0 | 0.0 | 0.9 | 1.1 |
| Protruding amount of center land portion and protruding amount of inner side middle land portion (Hcc/Hci) | | 0.0 | 0.0 | 0.9 | 1.1 |
| Presence/absence of groove when ground contact surface of center land portion contacts ground | | Yes | Yes | Yes | Yes |
| Presence/absence of groove when ground contact surface of outer side middle land portion and inner side middle land portion contact ground | | Yes | Yes | Yes | Yes |
| Land portion width of center land portion and land portion width of outer side middle land portion (Wco/Wcc) | | 1.1 | 1.1 | 1.1 | 1.1 |
| Land portion width of center land portion and land portion width of outer side shoulder land portion (Wso/Wcc) | | 1.0 | 1.0 | 1.0 | 1.0 |
| Land portion width of center land portion and land portion width of inner side middle land portion (Wci/Wcc) | | 1.0 | 1.0 | 1.0 | 1.0 |
| Land portion width of center land portion and land portion width of inner side shoulder land portion (Wsi/Wcc) | | 1.0 | 1.0 | 1.0 | 1.0 |
| Protruding amount of outer side shoulder land portion and protruding amount of inner side shoulder land portion (Hso/His) | | 0.0 | 0.0 | 0.0 | 0.0 |
| Steering stability performance on dry road surfaces | | 102 | 102 | 103 | 104 |
| Steering stability performance on wet road surfaces | | 101 | 102 | 103 | 103 |

FIG. 4B

| | | Example 8 | Example 9 | Example 10 | Example 11 |
|---|---|---|---|---|---|
| Presence/ absence of protrusion on ground contact surface | Outer side shoulder land portion | Yes | Yes | Yes | Yes |
| | Outer side middle land portion | Yes | Yes | Yes | Yes |
| | Center land portion | Yes | Yes | Yes | Yes |
| | Inner side middle land portion | Yes | Yes | Yes | Yes |
| | Inner side shoulder land portion | No | No | No | No |
| Land portion width Wcc of center land portion < land portion width Wco of outer side middle land portion | | Good | Good | Good | Good |
| Protruding amount Hco of outer side middle land portion < protruding amount Hso of outer side shoulder land portion | | Good | Good | Good | Good |
| Protruding amount Hco of outer side middle land portion [mm] | | 0.3 | 0.3 | 0.3 | 0.3 |
| Protruding amount Hso of outer side shoulder land portion [mm] | | 0.45 | 0.45 | 0.45 | 0.45 |
| Protruding amount of outer side middle land portion and protruding amount of outer side shoulder land portion (Hso/Hco) | | 1.5 | 1.5 | 1.5 | 1.5 |
| Protruding amount of center land portion and protruding amount of outer side middle land portion (Hcc/Hco) | | 1.0 | 1.0 | 1.0 | 1.0 |
| Protruding amount of center land portion and protruding amount of inner side middle land portion (Hcc/Hci) | | 1.0 | 1.0 | 1.0 | 1.0 |
| Presence/absence of groove when ground contact surface of center land portion contacts ground | | Yes | No | No | No |
| Presence/absence of groove when ground contact surface of outer side middle land portion and inner side middle land portion contact ground | | Yes | Yes | Yes | Yes |
| Land portion width of center land portion and land portion width of outer side middle land portion (Wco/Wcc) | | 1.1 | 1.1 | 1.2 | 1.4 |
| Land portion width of center land portion and land portion width of outer side shoulder land portion (Wso/Wcc) | | 1.0 | 1.0 | 1.4 | 1.6 |
| Land portion width of center land portion and land portion width of inner side middle land portion (Wci/Wcc) | | 1.0 | 1.0 | 0.9 | 1.1 |
| Land portion width of center land portion and land portion width of inner side shoulder land portion (Wsi/Wcc) | | 1.0 | 1.0 | 1.4 | 1.6 |
| Protruding amount of outer side shoulder land portion and protruding amount of inner side shoulder land portion (Hso/His) | | 0.0 | 0.0 | 0.0 | 0.0 |
| Steering stability performance on dry road surfaces | | 104 | 106 | 107 | 105 |
| Steering stability performance on wet road surfaces | | 104 | 103 | 104 | 105 |

FIG. 4C

|  |  | Example 12 | Example 13 | Example 14 | Example 15 |
|---|---|---|---|---|---|
| Presence/absence of protrusion on ground contact surface | Outer side shoulder land portion | Yes | Yes | Yes | Yes |
|  | Outer side middle land portion | Yes | Yes | Yes | Yes |
|  | Center land portion | Yes | Yes | Yes | Yes |
|  | Inner side middle land portion | Yes | Yes | Yes | Yes |
|  | Inner side shoulder land portion | No | Yes | Yes | Yes |
| Land portion width Wcc of center land portion < land portion width Wco of outer side middle land portion | | Good | Good | Good | Good |
| Protruding amount Hco of outer side middle land portion < protruding amount Hso of outer side shoulder land portion | | Good | Good | Good | Good |
| Protruding amount Hco of outer side middle land portion [mm] | | 0.3 | 0.3 | 0.3 | 0.3 |
| Protruding amount Hso of outer side shoulder land portion [mm] | | 0.45 | 0.45 | 0.45 | 0.45 |
| Protruding amount of outer side middle land portion and protruding amount of outer side shoulder land portion (Hso/Hco) | | 1.5 | 1.5 | 1.5 | 1.5 |
| Protruding amount of center land portion and protruding amount of outer side middle land portion (Hcc/Hco) | | 1.0 | 1.0 | 1.0 | 1.0 |
| Protruding amount of center land portion and protruding amount of inner side middle land portion (Hcc/Hci) | | 1.0 | 1.0 | 1.0 | 1.0 |
| Presence/absence of groove when ground contact surface of center land portion contacts ground | | No | No | No | No |
| Presence/absence of groove when ground contact surface of outer side middle land portion and inner side middle land portion contact ground | | Yes | Yes | Yes | Yes |
| Land portion width of center land portion and land portion width of outer side middle land portion (Wco/Wcc) | | 1.3 | 1.3 | 1.3 | 1.3 |
| Land portion width of center land portion and land portion width of outer side shoulder land portion (Wso/Wcc) | | 1.5 | 1.5 | 1.5 | 1.5 |
| Land portion width of center land portion and land portion width of inner side middle land portion (Wci/Wcc) | | 1.0 | 1.0 | 1.0 | 1.0 |
| Land portion width of center land portion and land portion width of inner side shoulder land portion (Wsi/Wcc) | | 1.5 | 1.5 | 1.5 | 1.5 |
| Protruding amount of outer side shoulder land portion and protruding amount of inner side shoulder land portion (Hso/His) | | 0.0 | 0.9 | 1.1 | 1.0 |
| Steering stability performance on dry road surfaces | | 106 | 109 | 111 | 110 |
| Steering stability performance on wet road surfaces | | 104 | 105 | 107 | 106 |

FIG. 4D

PNEUMATIC TIRE

TECHNICAL FIELD

The present invention relates to a pneumatic tire.

BACKGROUND ART

It is considered that in order to improve the steering stability on dry road surfaces, the land portion width of a tread portion should be set wide, with the aim of ensuring the tread rigidity. However, in this case, ground contact pressure at the center in a width direction of a land portion decreases, and a ground contact length in a tire circumferential direction of the land portion is reduced in a ground contact region. Accordingly, an end portion in the ground contact length is recessed inward, and thus contact with the ground is worsened. As a result, steering stability performance on dry road surfaces may deteriorate. Additionally, the ground contact pressure at the center in the width direction of the land portion decreases, and thus drainage performance deteriorates, and steering stability performance on wet road surfaces may also deteriorate.

In the related art, for example, Patent Documents 1 to 3 describe that steering stability performance on dry road surfaces and steering stability performance on wet road surfaces can be improved, by configuring a land portion such that the center of a ground contact surface in a width direction protrudes.

CITATION LIST

Patent Literature

Patent Document 1: JP 2013-189121 A
Patent Document 2: JP 2016-002890 A
Patent Document 3: JP 2014-118123 A

SUMMARY OF INVENTION

Technical Problem

However, in recent years, there has been a demand for further improvement in steering stability performance on dry road surfaces and steering stability performance on wet road surfaces due to the enhancement of vehicle performance.

The present invention is made in view of the foregoing, and an object of the present invention is to provide a pneumatic tire that can provide improved steering stability performance on dry road surfaces and improved steering stability performance on wet road surfaces.

Solution to Problem

In order to solve the aforementioned problem and achieve the object, a pneumatic tire according to an aspect of the present invention comprises a mounting direction specified with respect to a vehicle, the pneumatic tire comprising five land portions in a tire width direction, the five land portions being defined and formed by four circumferential main grooves extending in a tire circumferential direction on a ground contact surface of a tread portion, the five land portions forming a center land portion on a tire equatorial plane, an outer side middle land portion on a vehicle outer side of the center land portion, an outer side shoulder land portion on the vehicle outer side of the outer side middle land portion, an inner side middle land portion on a vehicle inner side of the center land portion, and an inner side shoulder land portion on the vehicle inner side of the inner side middle land portion. A land portion width $W_{cc}$ of the center land portion and a land portion width $W_{co}$ of the outer side middle land portion satisfy a relationship of $W_{cc}<W_{co}$. The ground contact surface of each of the outer side middle land portion and the outer side shoulder land portion protrudes toward an outer side in a tire radial direction with respect to a reference profile. A protruding amount $H_{co}$ of the outer side middle land portion and a protruding amount $H_{so}$ of the outer side shoulder land portion satisfy a relationship of $H_{co}<H_{so}$.

Further, in the pneumatic tire according to an aspect of the present invention, the protruding amount $H_{co}$ of the outer side middle land portion is preferably in a range of $0.2\ \text{mm} \leq H_{co} \leq 0.4\ \text{mm}$.

Furthermore, in the pneumatic tire according to an aspect of the present invention, the protruding amount $H_{so}$ of the outer side shoulder land portion is preferably in a range of $0.3\ \text{mm} \leq H_{so} \leq 0.6\ \text{mm}$.

Moreover, in the pneumatic tire according to an aspect of the present invention, the protruding amount $H_{co}$ of the outer side middle land portion and the protruding amount $H_{so}$ of the outer side shoulder land portion preferably satisfy a relationship of $1.2 \leq H_{so}/H_{co} \leq 2.0$.

Additionally, in the pneumatic tire according to an aspect of the present invention, the ground contact surface of each of the center land portion and the inner side middle land portion is preferably formed to protrude toward the outer side in the tire radial direction with respect to a reference profile. A protruding amount $H_{cc}$ of the center land portion and the protruding amount $H_{co}$ of the outer side middle land portion preferably satisfy a relationship of $0.9 \leq H_{cc}/H_{co} \leq 1.1$. The protruding amount $H_{cc}$ of the center land portion and a protruding amount $H_{ci}$ of the inner side middle land portion preferably satisfy a relationship of $0.9 \leq H_{cc}/H_{ci} \leq 1.1$.

Further, in the pneumatic tire according to an aspect of the present invention, no groove is preferably present on the ground contact surface of the center land portion when in contact with a ground. Grooves each comprising one end communicating with one of the circumferential main grooves, which is located an outer side in the tire width direction, when in contact with a ground, and the other end terminating within each of the outer side middle land portion and the inner side middle land portion are preferably present on the ground contact surface of each of the outer side middle land portion and the inner side middle land portion.

Furthermore, in the pneumatic tire according to an aspect of the present invention, the land portion width $W_{co}$ of the outer side middle land portion, a land portion width $W_{so}$ of the outer side shoulder land portion, a land portion width $W_{ci}$ of the inner side middle land portion, and a land portion width $W_{si}$ of the inner side shoulder land portion preferably satisfy relationships $1.2 \leq W_{co}/W_{cc} \leq 1.4$, $1.4 \leq W_{so}/W_{cc} \leq 1.6$, $0.9 \leq W_{ci}/W_{cc} \leq 1.1$, $1.4 \leq W_{si}/W_{cc} \leq 1.6$ with respect to the land portion width $W_{cc}$ of the center land portion.

Additionally, in the pneumatic tire according to an aspect of the present invention, the ground contact surface of the inner side shoulder land portion is preferably formed to protrude toward the outer side in the tire radial direction with respect to a reference profile. The protruding amount $H_{so}$ of the outer side shoulder land portion and a protruding amount $H_{si}$ of the inner side shoulder land portion preferably satisfy a relationship of $0.9 \leq H_{so}/H_{si} \leq 1.1$.

Advantageous Effects of Invention

According to an embodiment of the present invention, the land portion width $W_{cc}$ of the center land portion and the land portion width Wco of the outer side middle land portion satisfy the relationship of Wcc<Wco, and in a region where ground contact pressure on the vehicle outer side increases when cornering more than the center land portion, the ground contact surface of each of the outer side middle land portion and the outer side shoulder land portion is formed to protrude toward the outer side in the tire radial direction from the reference profile, and thus the ground contact length of each of the outer side middle land portion and the outer side shoulder land portion can be ensured. As a result, steering stability performance on dry road surfaces can be improved. Further, the land portion width Wcc of the center land portion and the land portion width Wco of the outer side middle land portion satisfy the relationship of Wcc<Wco, and in a region where ground contact pressure on the vehicle outer side increases when cornering more than the center land portion 31, the ground contact surface of each of the outer side middle land portion and the outer side shoulder land portion is formed to protrude toward the outer side in the tire radial direction from the reference profile. Thus, the ground contact pressure of each of the outer side middle land portion and the outer side shoulder land portion can be increased. As a result, water removal action is improved from the center portion in the tire width direction of each of the outer side middle land portion and the outer side shoulder land portion toward both sides thereof in the tire width direction, and steering stability performance on wet road surfaces can be improved. Additionally, by setting the protruding amount Hso of the outer side shoulder land portion, the ground contact length of which is reduced in the ground contact region compared with the other, to be greater than the protruding amount Hco of the outer side middle land portion located adjacent to and inward of the outer side shoulder land portion in the tire width direction, a sudden decrease in ground contact length between the outer side middle land portion and the outer side shoulder land portion can be suppressed, and good contact with the ground can be attained, which can contribute to improvement of steering stability performance on dry road surfaces and steering stability performance on wet road surfaces. As a result, steering stability performance on dry road surfaces and steering stability performance on wet road surfaces can be improved.

BRIEF DESCRIPTION OF DRAWINGS

FIG. 4 is a table showing the results of performance evaluation tests of pneumatic tires according to Examples of the present invention.

DESCRIPTION OF EMBODIMENTS

Embodiments of the present invention are described in detail below with reference to the drawings. However, the present invention is not limited by the embodiments. Constituents of the embodiments include elements that can be easily substituted by one skilled in the art or that are substantially identical. Furthermore, the plurality of modified examples described in the embodiment can be combined as desired within the scope apparent to one skilled in the art.

Figure 1:
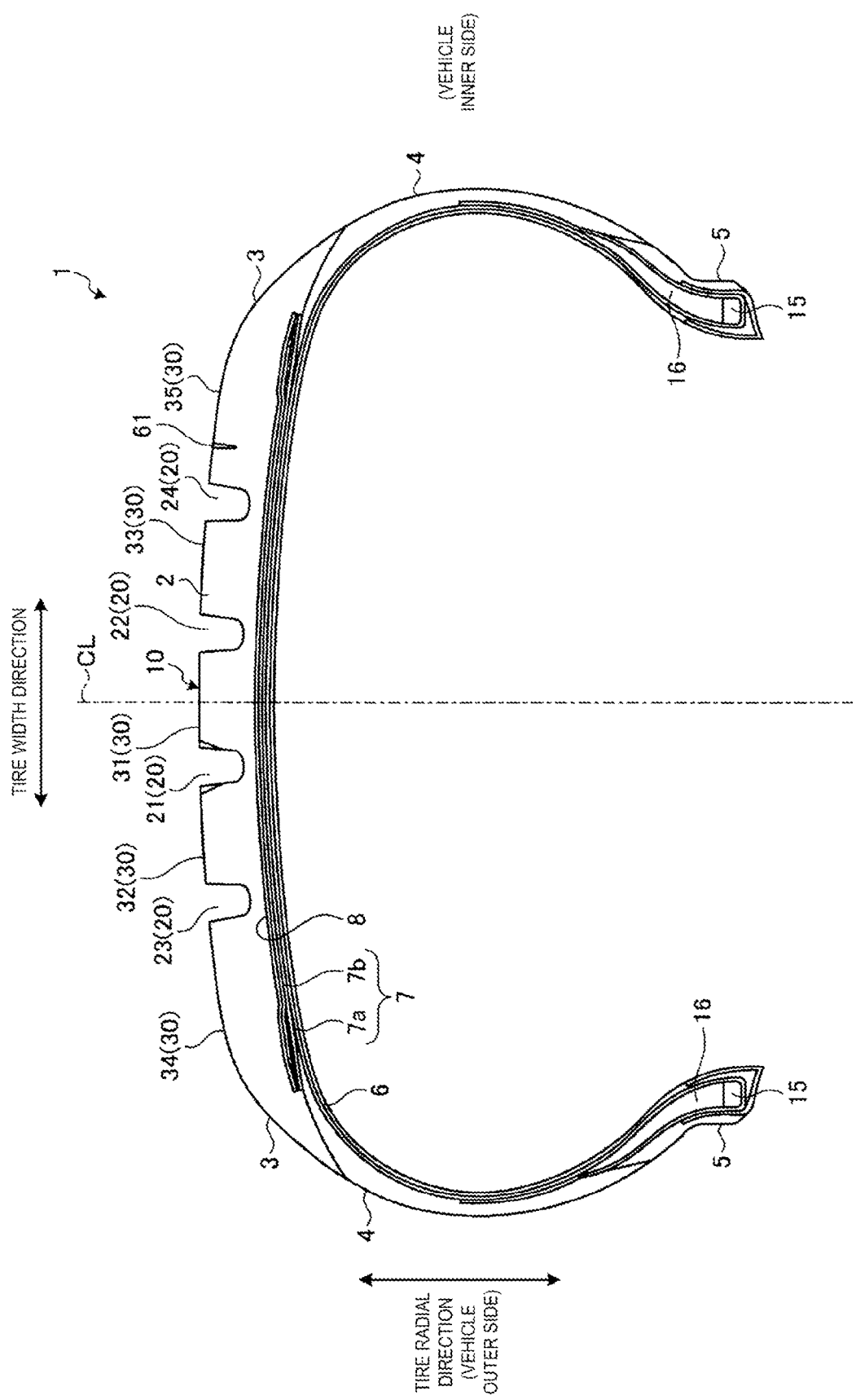
FIG. 1 is a meridian cross-sectional view of a pneumatic tire according to an embodiment of the present invention.
Figure 2:
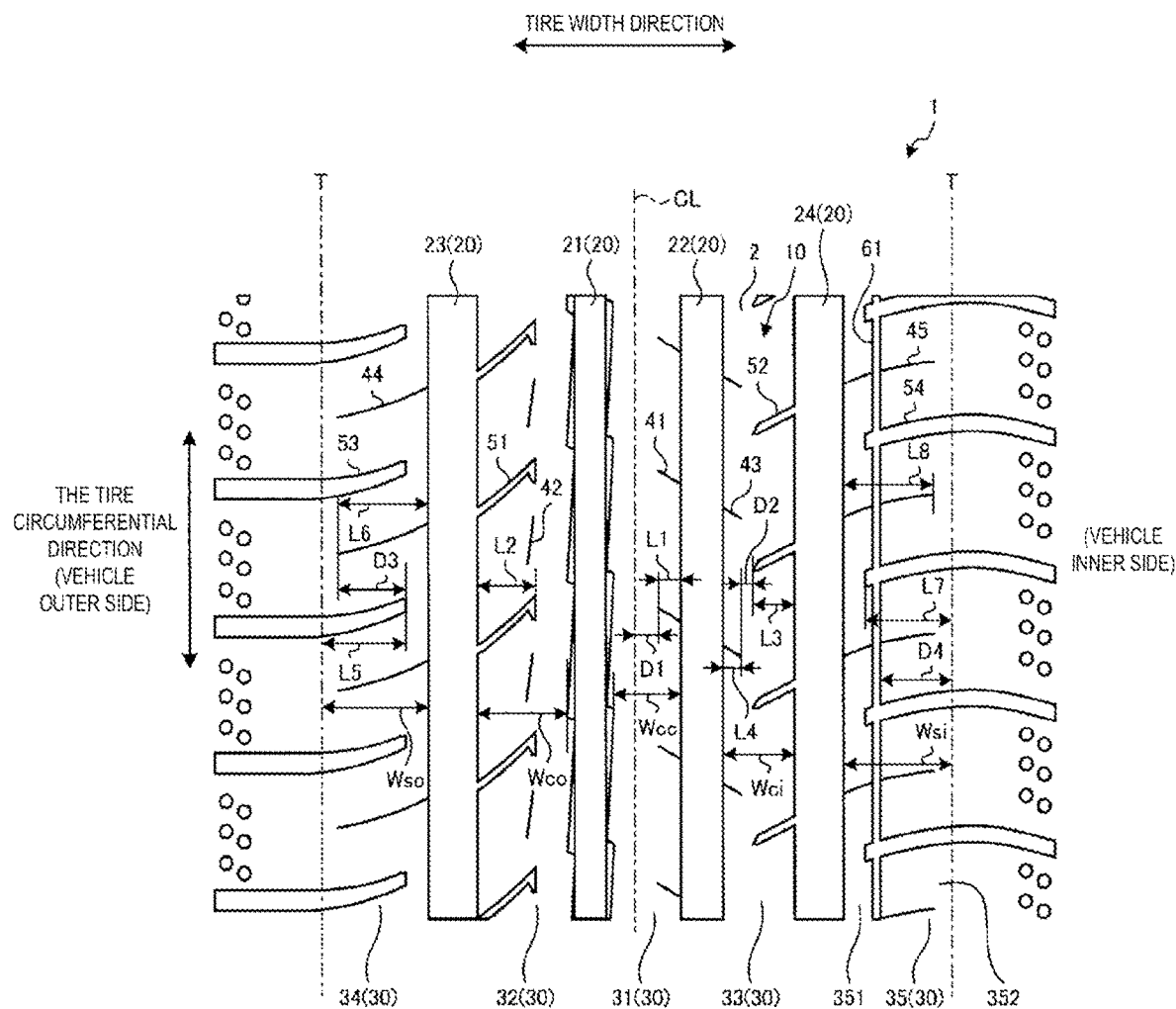
FIG. 2 is a plan view of a tread portion of a pneumatic tire according to an embodiment of the present invention.
Figure 3:
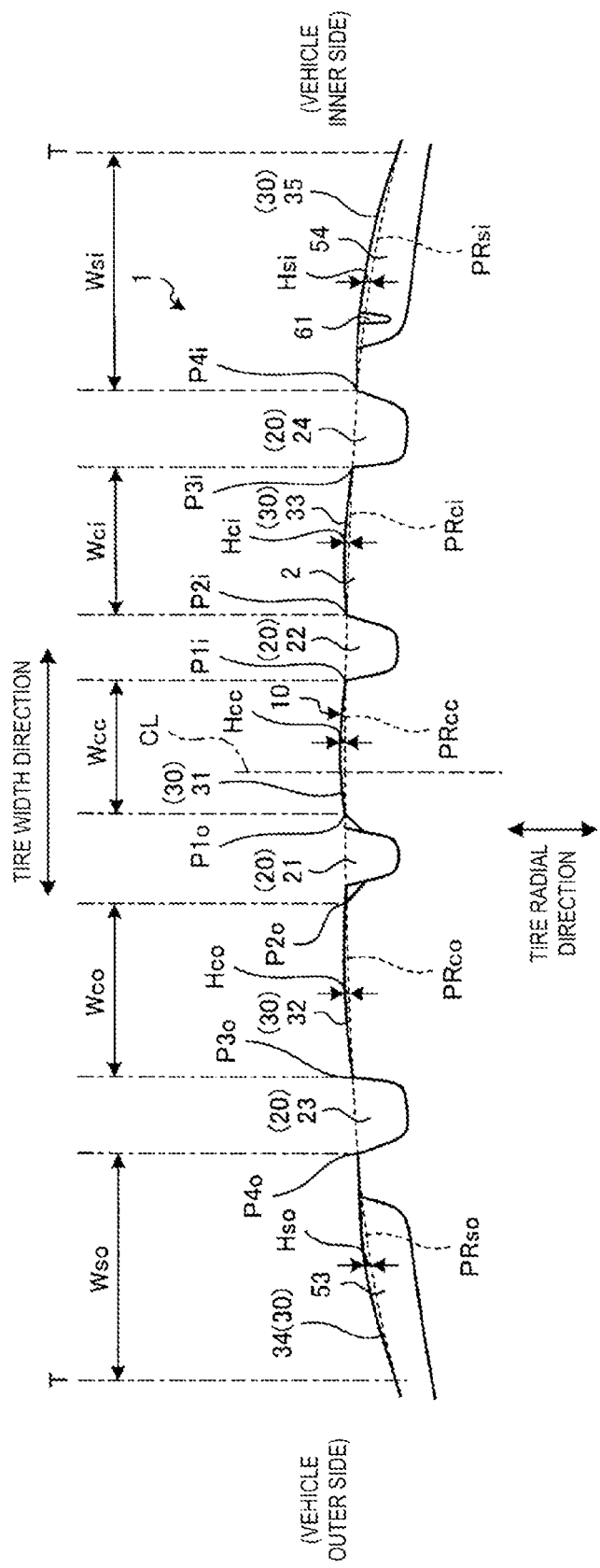
FIG. 3 is a detailed view of a tread portion of FIG. 1.

FIG. 1 is a meridian cross-sectional view of a pneumatic tire according to the present embodiment. FIG. 2 is a plan view of a tread portion of the pneumatic tire according to the present embodiment. FIG. 3 is a detailed view of a tread portion of FIG. 1.

In the following description, the tire radial direction refers to a direction orthogonal to the rotation axis (not illustrated) of a pneumatic tire 1, the inner side in the tire radial direction refers to the side facing the rotation axis in the tire radial direction, and the outer side in the tire radial direction refers to the side away from the rotation axis in the tire radial direction. Moreover, the tire circumferential direction refers to the circumferential direction with the rotation axis as the central axis. Additionally, the tire width direction refers to a direction parallel with the rotation axis, the inner side in the tire width direction refers to a side toward the tire equatorial plane (tire equator line) CL in the tire width direction, and the outer side in the tire width direction refers to a side away from the tire equatorial plane CL in the tire width direction. The tire equatorial plane CL is a plane that is orthogonal to the rotation axis of the pneumatic tire 1 and passes through the center of the tire width of the pneumatic tire 1, and in the tire equatorial plane CL, the center line in the tire width direction, which is the center position of the pneumatic tire 1 in the tire width direction, coincides with the position in the tire width direction. "Tire equator line" refers to a line lying on the tire equatorial plane CL and extending along the tire circumferential direction of the pneumatic tire 1. In the present embodiment, the tire equator line is denoted by the same reference sign CL as the tire equatorial plane.

As illustrated in FIG. 1, the pneumatic tire 1 of the present embodiment includes a tread portion 2, shoulder portions 3 on both sides of the tread portion 2, and from the respective shoulder portions 3, sidewall portions 4 and bead portions 5 are disposed in this order continuously. Additionally, the pneumatic tire 1 includes a carcass layer 6, a belt layer 7, and a belt reinforcing layer 8.

The tread portion 2 is made of a rubber material (tread rubber) and is exposed on the outermost side in the tire radial direction of the pneumatic tire 1, and the outer circumferential surface thereof is the contour of the pneumatic tire 1. The outer circumferential surface of the tread portion 2 is a surface that can come into contact with a road surface mainly during traveling, and is configured as a ground contact surface 10.

The shoulder portions 3 are portions of the tread portion 2 located on both outer sides in the tire width direction. Additionally, the sidewall portions 4 are exposed on the outermost sides of the pneumatic tire 1 in the tire width direction. Moreover, the bead portions 5 each include a bead core 15 and a bead filler 16. The bead core 15 is formed by winding a bead wire, which is a steel wire, into a ring shape. The bead filler 16 is a rubber material that is disposed in a space formed by folding back an end portion in the tire width direction of the carcass layer 6 at the position of the bead core 15.

Each end portion in the tire width direction of the carcass layer 6 is folded back around a pair of the bead cores 15 from the inner side in the tire width direction to the outer side in the tire width direction, and the carcass layer 6 is stretched in a toroidal shape in the tire circumferential direction to form the framework of the tire. The carcass layer 6 is made of a plurality of coating rubber-covered carcass cords (not illustrated) disposed side by side with an angle with respect to the tire circumferential direction along the tire meridian direction at an angle with respect to the tire circumferential direction. The carcass cords are made of organic fibers such as polyester, rayon, nylon, or the like. The carcass layer 6 is provided with at least one layer.

The belt layer 7 has a multilayer structure in which at least two belts 7a, 7b are layered, in the tread portion 2, and the belt layer 7 is arranged on the outer side in the tire radial direction, which is the outer circumference of the carcass layer 6, covering the carcass layer 6 in the tire circumferential direction. The belts 7a and 7b are formed by covering, with coating rubber, a plurality of cords (not illustrated) that are disposed side by side at a predetermined angle (for example, 20° to 30°) with respect to the tire circumferential direction. The cords are made, for example, of steel or organic fibers such as polyester, rayon, nylon or the like. The overlapping belts 7a and 7b are arranged so that the cords intersect with each other.

The belt reinforcing layer 8 is disposed on the outer side of the belt layer 7 in the tire radial direction, i.e. on the outer circumference thereof, and covers the belt layer 7 in the tire circumferential direction. The belt reinforcing layer 8 is formed by a plurality of coating rubber-covered cords (not illustrated) disposed substantially parallel to the tire circumferential direction and disposed side by side in the tire width direction. The cords are made, for example, of steel or organic fibers such as polyester, rayon, nylon, or the like, and the cord angle is within a range of ±5° with respect to the tire circumferential direction. The belt reinforcing layer 8 illustrated in FIG. 1 is disposed to cover the entirety of the belt layer 7. The configuration of the belt reinforcing layer 8 is not limited to that described above. While not explicitly illustrated in the drawings, a configuration may be used where the belt reinforcing layer 8 is disposed to cover only the end portions in the tire width direction of the belt layer 7. Alternatively, a configuration may be used where the belt reinforcing layer 8 includes two reinforcing layers, one of which is formed on the inner side in the tire radial direction to be longer in the tire width direction than the belt layer 7 and is disposed to cover the entirety of the belt layer 7, and the other of which is disposed on the outer side in the tire radial direction to cover only the end portions in the tire width direction of the belt layer 7. Alternatively, a configuration may be used where the belt reinforcing layer 8 includes two reinforcing layers, each of which is disposed to cover only the end portion in the tire width direction of the belt layer 7. In other words, the belt reinforcing layer 8 overlaps with at least the end portions of the belt layer 7 in the tire width direction. Additionally, the belt reinforcing layer 8 is disposed by winding a band-like strip material, which has, for example, a width of 10 mm, in the tire circumferential direction.

Note that the internal structure of the pneumatic tire 1 described above represents a typical example of the pneumatic tire 1; however, the internal structure is not limited thereto.

The pneumatic tire 1 of the present embodiment is a tire, the mounting direction of which is designated with respect to a vehicle. In other words, when the pneumatic tire 1 of the present embodiment is mounted on the vehicle, the orientation with respect to the inner side and the outer side of the vehicle in the tire width direction is designated. The orientation designations, while not illustrated in the drawings, for example, can be displayed via indicators provided on the sidewall portions 4. Thus, when mounted on the vehicle, the side facing the outer side of the vehicle is the vehicle outer side, and the side facing the inner side of the vehicle is the vehicle inner side. Note that the designations of the vehicle outer side and the vehicle inner side are not limited to the case where the tire is mounted on the vehicle. For example, in cases when the tire is mounted on a rim, the orientation of the rim with respect to the outer side and the inner side of the vehicle is predetermined in the tire width direction. Thus, in a case where the pneumatic tire 1 is mounted on the rim, the orientation with respect to the vehicle outer side and the vehicle inner side is designated in the tire width direction.

The ground contact surface 10 of the tread portion 2 is configured such that four circumferential main grooves 20 continuously extending in the tire circumferential direction and around the entire circumference of the tire are formed side by side in the tire width direction.

The circumferential main grooves 20 each are a groove that has obligation to display wear indicators specified by JATMA and that includes a groove width of 3.0 mm or greater and a groove depth of 6.0 mm or greater.

Note that the groove width, sipe width, and land portion width described below are measured as the maximum values of dimensions in the tire width direction of both groove opening ends opened on the ground contact surface 10, when the pneumatic tire 1 is mounted on a specified rim, inflated to the specified internal pressure, and in an unloaded state (specified load=0). In a configuration where notch portions and chamfered portions are formed in the groove opening edge, the groove width is measured with the groove opening end regarded as the outer edge of the notch portions and the chamfered portions and is measured including the notch portions and the chamfered portions. The groove depth and the sipe depth are measured as the maximum values of dimensions from the ground contact surface 10 to the groove bottom when the pneumatic tire 1 is mounted on a specified rim, inflated to the specified internal pressure, and in an unloaded state (specified load=0).

"Specified rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Further, "specified internal pressure" refers to the "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Furthermore, "specified load" refers to the "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

The circumferential main grooves 20 are disposed such that two circumferential main grooves are provided on the outer side in the tire width direction with the tire equatorial plane CL as a boundary. Additionally, on the vehicle outer side, the circumferential main groove 20 near the tire equatorial plane CL is referred to as an outer side center main groove 21, and the circumferential main groove 20 on the outer side in the tire width direction of the outer side center main groove 21 is referred to as an outer side shoulder main groove 23. On the vehicle inner side, the circumferential main groove 20 near the tire equatorial plane CL is referred to as an inner side center main groove 22, and the circumferential main groove 20 on the outer side in the tire width direction of the inner side center main groove 22 is referred to as an inner side shoulder main groove 24.

In the present embodiment, the circumferential main groove 20 is configured such that the outer side center main groove 21 extending in the tire circumferential direction is formed in a zigzag shape bent at a certain pitch on both sides in the tire width direction. The inner side center main groove 22, the outer side shoulder main groove 23, and the inner side shoulder main groove 24 of the other circumferential main grooves are formed in a linear shape in the tire circumferential direction. Triangular-shaped chamfered portions each having a long portion and a short portion are formed on the ground contact surface 10 side by side in the tire circumferential direction at the groove opening end of the outer side center main groove 21. The long portions and the short portions of the chamfered portions are point-symmetrically disposed at both groove opening ends, and thus the outer side center main groove 21 is formed in a zigzag shape.

Further, five land portions 30 aligned side by side in the tire width direction are defined and formed by the four circumferential main grooves 20 (21, 22, 23, 24) on the ground contact surface 10 of the tread portion 2. In addition, the land portion 30 formed on the tire equatorial plane CL between the outer side center main groove 21 and the inner side center main groove 22 is referred to as a center land portion 31. The land portion 30 formed between the outer side center main groove 21 and the outer side shoulder main groove 23 on the vehicle outer side is referred to as an outer side middle land portion 32. The land portion 30 formed on the outer side in the tire width direction of the outer side shoulder main groove 23 is referred to as an outer side shoulder land portion 34. The land portion 30 formed on the vehicle inner side between the inner side center main groove 22 and the inner side shoulder main groove 24 is referred to as an inner side middle land portion 33. The land portion 30 formed on the outer side in the tire width direction of the inner side shoulder main groove 24 is referred to as an inner side shoulder land portion 35. The outer side shoulder main groove 23 and the inner side shoulder main groove 24 are respectively located on ground contact edges T.

The ground contact edges T are both outermost edges of a ground contact region in the tire width direction. In FIG. 2, the ground contact edges T are illustrated continuously in the tire circumferential direction. The ground contact region is a region where the ground contact surface 10 of the tread portion 2 of the pneumatic tire 1 comes into contact with a dry, flat road surface when the pneumatic tire 1 is mounted on a specified rim, inflated to the specified internal pressure, and loaded with 70% of the specified load.

The center land portion 31 is provided with only sipes 41 formed on the ground contact surface 10. Each of the sipes 41 includes one end communicating with the inner side center main groove 22, extends toward the side of the tire equatorial plane CL (toward the inner side in the tire width direction), and includes the other end terminating within the ground contact surface 10 of the center land portion 31. A plurality of the sipes 41 are disposed at intervals in the tire circumferential direction. The sipe 41 has the sipe with a sipe width in a range of from 0.6 mm or greater to 1.8 mm or less; and a sipe depth in a range of from 3.0 mm or greater to 7.0 mm or less. The sipe 41 is closed when the ground contact surface 10 is brought into contact with the ground. The sipe 41 ensures tread rigidity and contributes to improvement of steering stability performance on dry road surfaces compared with a configuration in which a plurality of lug grooves are arranged in the tire circumferential direction in the center land portion 31. Additionally, the inclination angle of the sipe 41 with respect to the tire circumferential direction is within a range of from 45 degrees or greater to 80 degrees or less. By ensuring the inclination angle of 45 degrees or greater, the sipe 41 contributes to suppressing the occurrence of chipping wear. By ensuring the inclination angle of 80 degrees or less, the sipe 41 contributes to improvement of steering stability performance on wet road surfaces due to edge effects.

The sipe 41 is preferably configured such that a dimension L1 in the tire width direction and a land portion width Wcc of the center land portion 31 have a relationship of $0.30 \leq L1/Wcc \leq 0.60$. The land portion width Wcc of the center land portion 31 is the dimension in the tire width direction of the ground contact surface 10 excluding the chamfered portions of the circumferential main grooves 20 and is also referred to as a ground contact width that can actually make contact with a road surface. Hereinafter, the land portion widths of the other land portions are defined in the same manner. With $0.30 \leq L1/Wcc$, the sipe 41 ensures water removal action and contributes to improvement of steering stability performance on wet road surfaces. With $L1/Wcc \leq 0.60$, the sipe 41 ensures rigidity of the center land portion 31 and contributes to steering stability performance on dry road surfaces.

The outer side middle land portion 32 is provided with only lug grooves 51 and sipes 42 which are formed on the ground contact surface 10.

Each of the lug grooves 51 includes one end communicating with the outer side shoulder main groove 23, extends toward the inner side in the tire width direction, and includes the other end terminating within the ground contact surface 10 of the outer side middle land portion 32. The lug groove 51 is formed in a long shape mainly extending in the tire width direction and is provided with a bent portion at the other end and formed in a short shape mainly extending in the tire circumferential direction. A plurality of the lug grooves 51 are disposed at intervals in the tire circumferential direction. A sipe (not illustrated) is formed in the groove bottom along the long direction of the lug groove 51, and a chamfer is formed on the ground contact surface 10 side of the sipe. Thus, the lug groove 51 is formed in the configuration described above. The chamfer may be disposed on both sides in the sipe width of the sipe or only on one side in the sipe width. The sipe of the lug groove 51 has a sipe width in a range of from 0.3 mm or greater to 1.5 mm or less and a sipe depth from the ground contact surface 10 in a range of from 3.3 mm or greater to 4.5 mm or less. The depth of the chamfer of the sipe depth of the lug groove 51 is in a range of from 1.0 mm or greater to 3.0 mm or less, and the width of the chamfer is in a range of from 1.5 mm or greater to 4.5 mm or less. Only the sipe of the lug groove 51 is closed when the ground contact surface 10 is brought into contact with the ground.

The lug groove 51 is preferably configured such that a dimension L2 in the tire width direction and a land portion width Wco of the outer side middle land portion 32 have a relationship of $0.65 \leq L2/Wco \leq 0.85$. With $0.65 \leq L2/Wco$, the lug groove 51 ensures water removal action and contributes to improvement of steering stability performance on wet road surfaces. With $L2/Wco \leq 0.85$, the lug groove 51 ensures rigidity of the outer side middle land portion 32 and contributes to steering stability performance on dry road surfaces. In particular, the lug grooves 51 are disposed on an edge portion of the outer side middle land portion 32, which is located on the outer side in the tire width direction (located on the ground contact edge T side) where the contribution to water removal action is high, and thus the lug grooves 51 highly contribute to improvement of steering stability performance on wet road surfaces.

Each of the sipes 42 is singly disposed between terminating end portions of the lug grooves 51 located adjacent to each other in the tire circumferential direction and extends mainly in the tire circumferential direction. The sipe 42 is not in communication with the lug groove 51 and the circumferential main groove 20, and both ends of the sipe 42 are terminating within the ground contact surface 10 of the outer side middle land portion 32. The sipe 42 extends in parallel to the long portion of the chamfered portion of the outer side center main groove 21. The sipe 42 has a sipe width in a range of from 0.6 mm or greater to 1.8 mm or less; and a sipe depth in a range of from 3.0 mm or greater to 7.0 mm or less. The sipe 42 is closed when the ground contact surface 10 is brought into contact with the ground. As described above, with the lug grooves 51 having the dimension L2 in the tire width direction and with the arrangement between the terminating end portions of the lug grooves 51, the sipes 42 are appropriately disposed in relation to the lug grooves 51 and the circumferential main grooves 20. As a result, the outer side middle land portion 32 has a uniform rigidity, which contributes to steering stability performance on dry road surfaces.

The inner side middle land portion 33 is provided with only lug grooves 52 and sipes 43 which are formed in the ground contact surface 10.

Each of the lug grooves 52 includes one end communicating with the inner side shoulder main groove 24, extends toward the inner side in the tire width direction, and includes the other end terminating within the ground contact surface 10 of the inner side middle land portion 33. The lug groove 52 is formed in a long shape mainly extending in the tire width direction. A plurality of the lug grooves 52 are disposed at intervals in the tire circumferential direction. A sipe (not illustrated) is formed in the groove bottom along the long direction of the lug groove 52, and a chamfer is formed on the ground contact surface 10 side of the sipe. Thus, the lug groove 52 is formed in the configuration described above. The chamfer may be disposed on both sides in the sipe width of the sipe or only on one side in the sipe width. The sipe of the lug groove 52 has a sipe width in a range of from 0.3 mm or greater to 1.5 mm or less and a sipe depth from the ground contact surface 10 in a range of from 3.3 mm or greater to 4.5 mm or less. The depth of the chamfer of the sipe depth of the lug groove 51 is in a range of from 1.0 mm or greater to 3.0 mm or less, and the width of the chamfer is in a range of from 1.5 mm or greater to 4.5 mm or less. Only the sipe of the lug groove 51 is closed when the ground contact surface 10 is brought into contact with the ground.

The lug groove 52 is preferably configured such that a dimension L3 in the tire width direction and a land portion width Wci of the inner side middle land portion 33 have a relationship of $0.60 \leq L3/Wci \leq 0.70$. With $0.60 \leq L3/Wci$, the lug groove 52 ensures water removal action and contributes to improvement of steering stability performance on wet road surfaces. With $L3/Wci \leq 0.70$, the lug groove 52 ensures rigidity of the inner side middle land portion 33 and contributes to steering stability performance on dry road surfaces.

Each of the sipes 43 includes one end communicating with the inner side center main groove 22, extends toward the outer side in tire width direction, and includes the other end terminating within the ground contact surface 10 of the inner side middle land portion 33. A plurality of the sipes 43 are disposed at intervals in the tire circumferential direction. The sipe 43 has a sipe width in a range of from 0.6 mm or greater to 1.8 mm or less; and a sipe depth in a range of from 3.0 mm or greater to 7.0 mm or less. The sipe 43 is closed when the ground contact surface 10 is brought into contact with the ground. The sipes 43 are disposed alternately with respect to the lug grooves 52 in the tire circumferential direction. As a result, compared with a configuration in which only the lug grooves or the sipes are disposed in the tire circumferential direction, water removal action is ensured, which contributes to improvement of steering stability performance on wet road surfaces. In addition, the rigidity balance of the inner side middle land portion 33 is ensured, which contributes to improvement of steering stability performance on dry road surfaces. In particular, the lug grooves 52 are disposed on an edge portion of the inner side middle land portion 33, which is located on the outer side in the tire width direction (located on the ground contact edge T side) where the contribution to water removal action is high, and the sipes 43 are disposed on an edge portion of the inner side middle land portion 33, which is located on the inner side in the tire width direction (located on the tire equatorial plane CL side) where the contribution to improvement of rigidity is high. Thus, a relative balance between steering stability performance on wet road surfaces and steering stability performance on dry road surfaces can be effectively enhanced.

The sipe 43 is preferably configured such that a dimension L4 in the tire width direction and the land portion width Wci of the inner side middle land portion 33 have a relationship of $0.20 \leq L4/Wci \leq 0.25$. With $0.20 \leq L4/Wci$, the sipe 43 ensures water removal action and contributes to improvement of steering stability performance on wet road surfaces. With $L4/Wci \leq 0.25$, the sipe 43 ensures rigidity of the inner side middle land portion 33 and contributes to steering stability performance on dry road surfaces.

Note that the sipes 43 and the lug grooves 52 are disposed not to overlap with each other when viewed in the tire circumferential direction. Specifically, a dimension D2 in the tire width direction between a terminating end of the sipe 43 and a terminating end of the lug groove 52 is preferably in a range of $0.05 \leq D2/Wci \leq 0.20$, with respect to the land portion width Wci of the inner side middle land portion 33. As a result, compared with a configuration in which the sipes 43 and the lug grooves 52 overlap with each other when viewed in the tire circumferential direction, the rigidity of the inner side middle land portion 33 is ensured, which contributes to improvement of steering stability performance on dry road surfaces.

Further, the sipe 43 of the inner side middle land portion 33 and the sipe 41 of the center land portion 31 are inclined in an identical direction with respect to the tire circumferential direction. Furthermore, the sipe 43 and the sipe 41 extend along the extension lines of each other, and respective one ends thereof communicating with the inner side center main groove 22 are opposed to each other via the inner side center main groove 22. As a result, the sipe 43 and the sipe 41 ensure water removal action and contribute to improvement of steering stability performance on wet road surfaces.

The outer side shoulder land portion 34 is provided with only lug grooves 53 and sipes 44 which are formed in the ground contact surface 10.

Each of the lug grooves 53 extends from the outer side in the tire width direction to intersect with the ground contact edge T and extend toward the inner side in the tire width direction. An extension end of the lug groove 53 is terminating within the ground contact surface 10 of the outer side shoulder land portion 34 without communicating with the outer side shoulder main groove 23. A plurality of the lug grooves 53 are disposed at intervals in the tire circumferential direction. The lug groove 53 has a groove width in a range of from 1.5 mm or greater to 4.5 mm or less; and a groove depth in a range of from 55% or greater to 80% or less of a groove depth of the outer side shoulder main groove 23.

The lug groove 53 is preferably configured such that a dimension L5 from the ground contact edge T to the inner side in the tire width direction and a land portion width Wso of the outer side shoulder land portion 34 have a relationship of $0.50 \leq L5/Wso \leq 0.85$. With $0.50 \leq L5/Wso$, the lug groove 53 ensures water removal action and contributes to improvement of steering stability performance on wet road surfaces. With $L5/Wso \leq 0.85$, the lug groove 53 ensures rigidity of the outer side shoulder land portion 34 and contributes to steering stability performance on dry road surfaces. The land portion width Wso of the outer side shoulder land portion 34 is the dimension in the tire width direction between an edge portion of the outer side shoulder main groove 23, which is located on the outer side in the tire width direction, and the ground contact edge T on the vehicle outer side.

Each of the sipes 44 includes one end communicating with the outer side shoulder main groove 23, extends toward the outer side in the tire width direction, and includes the other end terminating within the ground contact surface 10 of the outer side shoulder land portion 34 without intersecting with the ground contact edge T. A plurality of the sipes 44 are disposed at intervals in the tire circumferential direction. The sipe 44 has a sipe width in a range of from 0.6 mm or greater to 1.8 mm or less; and a sipe depth in a range of 3.0 mm or greater to 7.0 mm or less. The sipe 44 is closed when the ground contact surface 10 is brought into contact with the ground. The sipes 44 are disposed alternately with respect to the lug grooves 53 in the tire circumferential direction. As a result, compared with a configuration in which only the lug grooves or the sipes are disposed in the tire circumferential direction, water removal action is ensured, which contributes improvement of steering stability performance on wet road surfaces. In addition, the rigidity balance of the outer side shoulder land portion 34 is ensured, which contributes to improvement of steering stability performance on dry road surfaces.

The sipe 44 is preferably configured such that a dimension L6 in the tire width direction and the land portion width Wso of the outer side shoulder land portion 34 have a relationship of $0.50 \leq L6/Wso \leq 0.85$. With $0.50 \leq L6/Wso$, the sipe 44 ensures water removal action and contributes to improvement of steering stability performance on wet road surfaces. With $L6/Wso \leq 0.85$, the sipe 44 ensures rigidity of the outer side shoulder land portion 34 and contributes to steering stability performance on dry road surfaces.

In addition, the sipes 44 and the lug grooves 53 are disposed to overlap each other when viewed in the tire circumferential direction. Specifically, a dimensions D3 in the tire width direction between respective terminating ends of the sipe 44 and the lug groove 53 which overlap each other is preferably in a range of $0.50 \leq D3/Wso \leq 0.70$ with respect to the land portion width Wso of the outer side shoulder land portion 34. As a result, compared with a configuration in which the sipes 44 and the lug grooves 53 do not overlap each other when viewed in the tire circumferential direction, water removal action is ensured, which contributes to improvement of steering stability performance on wet road surfaces.

Only a circumferential narrow groove 61, lug grooves 54, and sipes 45 are formed in the inner side shoulder land portion 35.

The circumferential narrow groove 61 is a narrow groove extending in the tire circumferential direction and is continuously formed in the entire circumference of the tire. The circumferential narrow groove 61 has a groove width in a range of from 0.8 mm or greater to 3.0 mm or less and a groove depth in a range of from 0.8 mm or greater to 3.0 mm or less. The inner side shoulder land portion 35 is divided by the circumferential narrow groove 61 into an inner land portion 351 located on the inner side shoulder main groove 24 side and on the inner side in the tire width direction; and an outer land portion 352 located on the ground contact edge T side and on the outer side in the tire width direction.

A dimension D4 in the tire width direction from an edge portion of the circumferential narrow groove 61, which is located on the outer side in the tire width direction, to the ground contact edge T on the vehicle inner side; and a land portion width Wsi of the inner side shoulder land portion 35 preferably have a relationship of $0.55 \leq D4/Wsi \leq 0.85$. As a result, in the inner side shoulder land portion 35, the position of the circumferential narrow groove 61 in the tire width direction is set, and the circumferential narrow groove 61 appropriately exerts water removal action and contributes to improvement of steering stability performance on wet road surfaces. Additionally, in the inner side shoulder land portion 35, the circumferential narrow groove 61 sets land portion widths of the inner land portion 351 and the outer land portion 352, provides appropriate rigidity of the inner land portion 351 and the outer land portion 352, and thus contributes to improvement of steering stability performance on dry road surfaces.

Each of the lug grooves 54 extends from the outer side in the tire width direction to intersect with the ground contact edge T and extend toward the inner side in the tire width direction. An extension end of the lug groove 54 is terminating within the ground contact surface 10 of the inner side shoulder land portion 35 without communicating with the inner side shoulder main groove 24. The lug groove 54 penetrates through the circumferential narrow groove 61 and has a terminating end present within the ground contact surface 10 of the inner land portion 351. A plurality of the lug grooves 54 are disposed at intervals in the tire circumferential direction. The lug groove 54 has a groove width in a range of from 1.5 mm or greater to 4.5 mm or less; and a groove depth in a range of from 55% or greater to 80% or less of a groove depth of the inner side shoulder main groove 24.

The lug groove 54 is preferably configured such that a dimension L7 from the ground contact edge T to the inner side in the tire width direction and the land portion width Wsi of the inner side shoulder land portion 35 have a relationship of $0.60 \leq L7/Wsi \leq 0.85$. With $0.60 \leq L7/Wsi$, the lug groove 54 ensures water removal action and contributes to improvement of steering stability performance on wet road surfaces. With $L7/Wsi \leq 0.85$, the lug groove 54 secures the rigidity of the inner side shoulder land portion 35, in particular, rigidity of the inner land portion 351, and contributes to steering stability performance on dry road surfaces. The land portion width Wsi of the inner side shoulder land portion 35 is the dimension in the tire width direction between an edge portion of the inner side shoulder main groove 24, which is located on the outer side in the tire width direction, and the ground contact edge T on the vehicle inner side.

Each of the sipes 45 includes one end communicating with the inner side shoulder main groove 24, extends toward the outer side in the tire width direction, and includes the other end terminating within the ground contact surface 10 of the inner side shoulder land portion 35 without intersecting with the ground contact edge T. The sipe 45 penetrates through the circumferential narrow groove 61 and has a terminating end present within the ground contact surface 10 of the outer land portion 352. A plurality of the sipes 45 are disposed at intervals in the tire circumferential direction. The sipe 45 has a sipe width in a range of from 0.6 mm or greater to 1.8 mm or less; and a sipe depth in a range of from 3.0 mm or greater to 7.0 mm or less. The sipe 45 is closed when the ground contact surface 10 is brought into contact with the ground. The sipes 45 are disposed alternately with respect to the lug grooves 53 in the tire circumferential direction. As a result, compared with a configuration in which only the lug grooves or the sipes are disposed in the tire circumferential direction, water removal action is ensured, which contributes to improvement of steering stability performance on wet road surfaces. In addition, the rigidity balance of the inner side shoulder land portion 35 is ensured, which contributes to improvement of steering stability performance on dry road surfaces.

The sipe 45 is preferably configured such that a dimension L8 in the tire width direction and the land portion width Wsi of the inner side shoulder land portion 35 have a relationship of $0.70 \leq L8/Wsi \leq 0.90$. With $0.70 \leq L8/Wsi$, the sipe 45 ensures water removal action and contributes to improvement of steering stability performance on wet road surfaces. With $L8/Wsi \leq 0.90$, the sipe 45 secures rigidity of the inner side shoulder land portion 35, in particular, rigidity of the outer land portion 352, and contributes to steering stability performance on dry road surfaces.

In addition, the sipes 45 and the lug grooves 54 are disposed to overlap each other when viewed in the tire circumferential direction. As a result, compared with a configuration in which the sipes 45 and the lug grooves 54 do not overlap each other when viewed in the tire circumferential direction, water removal action is ensured, which contributes to improvement of steering stability performance on wet road surfaces.

In the pneumatic tire 1 of the present embodiment described above, the land portion width Wcc of the center land portion 31 and the land portion width Wco of the outer side middle land portion 32 satisfy a relationship of Wcc<Wco. Additionally, in the pneumatic tire 1 of the present embodiment, the ground contact surface 10 of each of the outer side middle land portion 32 and the outer side shoulder land portion 34 is formed to protrude toward the outer side in the tire radial direction with respect to a reference profile, and a protruding amount Hco of the outer side middle land portion 32 and a protruding amount Hso of the outer side shoulder land portion 34 satisfy a relationship of Hco<Hso.

Here, as illustrated in FIG. 3, a reference profile PRco of the outer side middle land portion 32 is an arc in a meridian cross-sectional view in an unloaded state (specified load=0) in which the pneumatic tire 1 is mounted on a specified rim and inflated to the specified internal pressure. The arc passes through three points of respective groove opening ends P1o, P2o of the outer side center main groove 21 and a groove opening end P3o on the inner side in the tire width direction of the outer side shoulder main groove 23. Additionally, in the land portion width Wco of the outer side middle land portion 32, which is a dimension in the tire width direction between the groove opening end P2o on the outer side in the tire width direction of the outer side center main groove 21 and the groove opening end P3o on the inner side in the tire width direction of the outer side shoulder main groove 23, the ground contact surface 10 of the outer side middle land portion 32 protrudes toward the outer side in the tire radial direction from the respective groove opening ends P2o, P3o toward the center portion in the tire width direction while being formed in a gradually curved line (or an arc). Namely, in other words, the protruding amount Hco of the outer side middle land portion 32 is a protruding difference from the reference profile PRco with respect to the respective groove opening ends P2o, P3o that are end portions of the land portion width Wco in the tire width direction.

Further, a reference profile PRso of the outer side shoulder land portion 34 is an arc in a meridian cross-sectional view in an unloaded state (specified load=0) in which the pneumatic tire 1 is mounted on a specified rim and inflated to the specified internal pressure. The arc passes through three points of the groove opening end P3o and a groove opening end P4o of the outer side shoulder main groove 23 and the ground contact edge T on the vehicle outer side. In addition, in the land portion width Wso of the outer side shoulder land portion 34, which is a dimension in the tire width direction between the groove opening end P4o on the outer side in the tire width direction of the outer side shoulder main groove 23 and the ground contact edge T on the vehicle outer side, the ground contact surface 10 of the outer side shoulder land portion 34 protrudes toward the outer side in the tire radial direction from the groove opening end P4o and the ground contact edge T on the vehicle outer side toward the center portion in the tire width direction while being formed in a gradually curved line (or an arc). Namely, in other words, the protruding amount Hso of the outer side shoulder land portion 34 is a protruding difference from the reference profile PRso with respect to the groove opening end P4o that is an end portion of the land portion width Wso in the tire width direction, and the ground contact edge T on the vehicle outer side.

Thus, according to the pneumatic tire 1, the land portion width Wcc of the center land portion 31 and the land portion width Wco of the outer side middle land portion 32 satisfy the relationship of Wcc<Wco, and in a region where ground contact pressure on the vehicle outer side increases when cornering more than the center land portion 31, the ground contact surface 10 of each of the outer side middle land portion 32 and the outer side shoulder land portion 34 is formed to protrude toward the outer side in the tire radial direction from the reference profile PRco, PRso, and thus the ground contact length of the center portion in the tire width direction of each of the outer side middle land portion 32 and the outer side shoulder land portion 34 can be ensured. The ground contact length is the dimension in the tire circumferential direction in the ground contact region described above. As a result, steering stability performance on dry road surfaces can be maintained. Additionally, the land portion width Wcc of the center land portion 31 and the land portion width Wco of the outer side middle land portion 32 satisfy the relationship of Wcc<Wco, and in a region where ground contact pressure on the vehicle outer side increases when cornering more than the center land portion 31, the ground contact surface 10 of each of the outer side middle land portion 32 and the outer side shoulder land portion 34 is formed to protrude toward the outer side in the tire radial direction from the reference profile PRco, PRso. Thus, the ground contact pressure at the center portion in the tire width direction of each of the outer side middle land portion 32 and the outer side shoulder land portion 34 can be increased. As a result, water removal action is improved from the center portion in the tire width direction of each of the outer side middle land portion 32 and the outer side shoulder land portion 34 toward both sides thereof in the tire width direction, and steering stability performance on wet road surfaces can be improved. Furthermore, by setting the protruding amount Hso of the outer side shoulder land portion 34, the ground contact length of which is reduced in the ground contact region compared with the other, to be greater than the protruding amount Hco of the outer side middle land portion 32 located adjacent to and inward of the outer side shoulder land portion 34 in the tire width direction, a sudden decrease in ground contact length between the outer side middle land portion 32 and the outer side shoulder land portion 34 can be suppressed, and good contact with the ground can be attained, which can contribute to improvement of steering stability performance on dry road surfaces and steering stability performance on wet road surfaces. As a result, steering stability performance on dry road surfaces and steering stability performance on wet road surfaces can be improved.

Additionally, in the pneumatic tire 1 of the present embodiment, the protruding amount Hco of the outer side middle land portion 32 is preferably in a range of 0.2 mm≤Hco≤0.4 mm.

According to the pneumatic tire 1, by setting the protruding amount Hco of the outer side middle land portion 32 at 0.2 mm or greater, the ground contact pressure at the center portion in the tire width direction of the outer side middle land portion 32 can be brought close to the ground contact pressure on both sides thereof in the tire width direction. On the other hand, by setting the protruding amount Hco of the outer side middle land portion 32 at 0.4 mm or less, an excessive decrease in ground contact pressure on both sides of the outer side middle land portion 32 in the tire width direction can be suppressed. As a result, the outer side middle land portion 32 can provide a good contact with the ground, and the grip force with the road surface can be increased. Accordingly, steering stability performance on dry road surfaces and steering stability performance on wet road surfaces can be improved.

Moreover, in the pneumatic tire 1 of the present embodiment, the protruding amount Hso of the outer side shoulder land portion 34 is preferably in a range of 0.3 mm≤Hso≤0.6 mm.

According to the pneumatic tire 1, by setting the protruding amount Hso of the outer side shoulder land portion 34 at 0.3 mm or greater, the ground contact pressure at the center portion in the tire width direction of the outer side shoulder land portion 34 can be brought close to the ground contact pressure on both sides thereof in the tire width direction. On the other hand, by setting the protruding amount Hso of the outer side shoulder land portion 34 at 0.6 mm or less, an excessive decrease in ground contact pressure on both sides of the outer side shoulder land portion 34 in the tire width direction can be suppressed. As a result, the outer side shoulder land portion 34 can provide good contact with the ground, and the grip force with the road surface can be increased. Accordingly, steering stability performance on dry road surfaces and steering stability performance on wet road surfaces can be improved.

Additionally, in the pneumatic tire 1 of the present embodiment, the protruding amount Hco of the outer side middle land portion 32 and the protruding amount Hso of the outer side shoulder land portion 34 satisfy a relationship of 1.2≤Hso/Hco≤2.0.

According to the pneumatic tire 1, the balance between the ground contact pressure at the outer side middle land portion 32 and the ground contact pressure at the outer side shoulder land portion 34 is ensured, and the outer side middle land portion 32 and the outer side shoulder land portion 34 can provide a good contact with the ground. In a region where ground contact pressure on the vehicle outer side increases when cornering more than the center land portion 31, the grip force with the road surface can be increased. Accordingly, steering stability performance on dry road surfaces and steering stability performance on wet road surfaces can be improved.

Further, in the pneumatic tire 1 of the present embodiment, the ground contact surface 10 of each of the center land portion 31 and the inner side middle land portion 33 is formed to protrude toward the outer side in the tire radial direction with respect to a reference profile PRcc, PRci. A protruding amount Hcc of the center land portion 31 and the protruding amount Hco of the outer side middle land portion 32 preferably satisfy a relationship of 0.9≤Hcc/Hco≤1.1, and the protruding amount Hcc of the center land portion 31 and a protruding amount Hci of the inner side middle land portion 33 preferably satisfy a relationship of 0.9≤Hcc/Hci≤1.1.

Here, as illustrated in FIG. 3, the reference profile PRcc of the center land portion 31 is an arc in a meridian cross-sectional view in an unloaded state (specified load=0) in which the pneumatic tire 1 is mounted on a specified rim and inflated to the specified internal pressure. The arc passes through three points of the respective groove opening ends P1o, P2o of the outer side center main groove 21 and a groove opening end P1i on the inner side in the tire width direction of the inner side center main groove 22, or the arc passes through three points of the groove opening end P1i and a groove opening end P2i of the inner side center main groove 22 and the groove opening end P2i on the inner side in tire width direction of the outer side center main groove 21. Additionally, in the land portion width Wcc of the center land portion 31, which is a dimension in the tire width direction between the groove opening end P1o on the inner side in the tire width direction of the outer side center main groove 21 and the groove opening end P1i on the inner side in the tire width direction of the inner side center main groove 22, the ground contact surface 10 of the center land portion 31 protrudes toward the outer side in the tire radial direction from the respective groove opening ends P1o, P1i toward the center portion in the tire width direction while being formed in a gradually curved line (or an arc). In other words, the protruding amount Hcc of the center land portion 31 is a protruding difference from the reference profile PRcc with respect to the respective groove opening ends P1o, P1i, which are end portions of the land portion width Wcc in the tire width direction.

Furthermore, the reference profile PRci of the inner side middle land portion 33 is an arc in a meridian cross-sectional view in an unloaded state (specified load=0) in which the pneumatic tire 1 is mounted on a specified rim and inflated to the specified internal pressure. The arc passes through three points of the respective groove opening ends P1i, P2i of the inner side center main groove 22 and a groove opening end P3i on the inner side in the tire width direction of the inner side shoulder main groove 24. Additionally, in the land portion width Wci of the inner side middle land portion 33, which is a dimension in the tire width direction between the groove opening end P2i on the outer side in the tire width direction of the inner side center main groove 22 and the groove opening end P3i on the inner side in the tire width direction of the inner side shoulder main groove 24, the ground contact surface 10 of the inner side middle land portion 33 protrudes toward the outer side in the tire radial direction from the respective groove opening ends P2i, P3i toward the center portion in the tire width direction while being formed in a gradually curved line (or an arc). Namely, in other words, the protruding amount Hci of the inner side middle land portion 33 is a protruding difference from the reference profile PRci with respect to the respective groove opening ends P2$i$, P3$i$ that are end portions of the land portion width Wci in the tire width direction.

Accordingly, according to the pneumatic tire 1, the ground contact surface 10 of each of the center land portion 31 and the inner side middle land portion 33 is also formed to protrude toward the outer side in the tire radial direction from the reference profile PRcc, PRci, and thus the ground contact length at the center portion in the tire width direction of each of the center land portion 31 and the inner side middle land portion 33 can be ensured. As a result, steering stability performance on dry road surfaces can be improved. In addition, the ground contact surface 10 of each of the center land portion 31 and the inner side middle land portion 33 is also formed to protrude toward the outer side in the tire radial direction from the reference profile PRcc, PRci, and thus the ground contact pressure at the center portion in the tire width direction of each of the center land portion 31 and the inner side middle land portion 33 can be increased. Thus, water removal action is improved from the center portion in the tire width direction of each of the center land portion 31 and the inner side middle land portion 33 toward both sides thereof in the tire width direction, and steering stability performance on wet road surfaces can be improved. As a result, steering stability performance on dry road surfaces and steering stability performance on wet road surfaces can be improved. Additionally, the protruding amount Hcc of the center land portion 31 and the protruding amount Hco of the outer side middle land portion 32 satisfy the relationship of 0.9≤Hcc/Hco≤1.1, and the protruding amount Hcc of the center land portion 31 and the protruding amount Hci of the inner side middle land portion 33 satisfy the relationship of 0.9≤Hcc/Hci≤1.1. Accordingly, in the center land portion 31, the outer side middle land portion 32, and the inner side middle land portion 33, the ground contact pressure can be prevented from excessively varying. The center land portion 31, the outer side middle land portion 32, and the inner side middle land portion 33 provide a good contact with the ground. Thus, the grip force with the road surface can be increased, and steering stability performance on dry road surfaces and steering stability performance on wet road surfaces can be improved.

Further, in the pneumatic tire 1 of the present embodiment, no groove is preferably present on the ground contact surface 10 of the center land portion 31 when in contact with the ground. Grooves (the lug grooves 51, 52) each having one end communicating with the circumferential main groove 20 on the outer side in the tire width direction (the outer side shoulder main groove 23 or the inner side shoulder main groove 24) and the other end terminating within the outer side middle land portion 32 or the inner side middle land portion 33 are preferably present on the ground contact surface 10 of each of the outer side middle land portion 32 and the inner side middle land portion 33 when in contact with the ground.

According to the pneumatic tire 1, no groove is present on the ground contact surface 10 of the center land portion 31 when in contact with the ground. Thus, the center land portion 31 ensures land portion rigidity and provides a good contact with the ground. As a result, the grip force with the road surface can be increased, and steering stability performance on dry road surfaces can be improved. Furthermore, grooves (the lug grooves 51, 52) each having one end communicating with the circumferential main groove 20 on the outer side in the tire width direction (the outer side shoulder main groove 23 or the inner side shoulder main groove 24) and the other end terminating within the outer side middle land portion 32 or the inner side middle land portion 33 are present on the ground contact surface 10 of each of the outer side middle land portion 32 and the inner side middle land portion 33. Thus, the rigidity is prevented from decreasing while water removal action is ensured. As a result, steering stability performance on dry road surfaces can be improved while steering stability performance on wet road surfaces is maintained.

Additionally, in the pneumatic tire 1 of the present embodiment, the land portion width Wco of the outer side middle land portion 32, the land portion width Wso of the outer side shoulder land portion 34, the land portion width Wci of the inner side middle land portion 33, and the land portion width Wsi of the inner side shoulder land portion 35 satisfy relationships 1.2≤Wco/Wcc≤1.4, 1.4≤Wso/Wcc≤1.6, 0.9≤Wci/Wcc≤1.1, 1.4≤Wsi/Wcc≤1.6 with respect to the land portion width Wcc of the center land portion 31.

According to the pneumatic tire 1, the land portion width Wco of the outer side middle land portion 32 is formed to be 1.2 times to 1.4 times as large as the land portion width Wcc of the center land portion 31. The land portion width Wso of the outer side shoulder land portion 34 is formed to be 1.4 times to 1.6 times as large as the land portion width Wcc of the center land portion 31. The land portion width Wci of the inner side middle land portion 33 is formed to be equivalent to the land portion width Wcc of the center land portion 31. The land portion width Wsi of the inner side shoulder land portion 35 is formed to be 1.4 times to 1.6 times as large as the land portion width Wcc of the center land portion 31. As a result, the grip force with the road surface can be enhanced in a well-balanced manner entirely in the tire width direction of the ground contact region, and steering stability performance on dry road surfaces and steering stability performance on wet road surfaces can be improved.

Moreover, in the pneumatic tire 1 of the present embodiment, the ground contact surface 10 of the inner side shoulder land portion 35 is formed to protrude toward the outer side in the tire radial direction with respect to a reference profile PRsi, and the protruding amount Hso of the outer side shoulder land portion 34 and a protruding amount Hsi of the inner side shoulder land portion 35 preferably satisfy a relationship of 0.9≤Hso/Hsi≤1.1.

Here, as illustrated in FIG. 3, the reference profile PRsi of the inner side shoulder land portion 35 is an arc in a meridian cross-sectional view in an unloaded state (specified load=0) in which the pneumatic tire 1 is mounted on a specified rim and inflated to the specified internal pressure. The arc passes through three points of the respective groove opening ends P3$i$, P4$i$ of the inner side shoulder main groove 24 and the ground contact edge T on the vehicle inner side. In addition, in the land portion width Wsi of the inner side shoulder land portion 35, which is a dimension in the tire width direction between the groove opening end P4$i$ on the outer side in the tire width direction of the inner side shoulder main groove 24 and the ground contact edge T on the vehicle inner side, the ground contact surface 10 of the inner side shoulder land portion 35 protrudes toward the outer side in the tire radial direction from the groove opening end P4$i$ and the ground contact edge T on the vehicle inner side toward the center portion in the tire width direction while being formed in a gradually curved line (or an arc). Namely, in other words, the protruding amount Hsi of the inner side shoulder land portion 35 is a protruding difference from the reference profile PRsi with respect to the groove opening end P4$i$ that is an end portion of the land portion width Wsi in the tire width direction and the ground contact edge T on the vehicle inner side.

Accordingly, according to the pneumatic tire 1, the ground contact surface 10 of the inner side shoulder land portion 35 is also formed to protrude toward the outer side in the tire radial direction from the reference profile PRsi, and thus the ground contact length at the center portion in the tire width direction of the inner side shoulder land portion 35 can be ensured. As a result, steering stability performance on dry road surfaces can be improved. In addition, the ground contact surface 10 of the inner side shoulder land portion 35 is also formed to protrude toward the outer side in the tire radial direction from the reference profile PRsi, and thus the ground contact pressure at the center portion in the tire width direction of the inner side shoulder land portion 35 can be increased. Thus, water removal action is improved from the center portion in the tire width direction of the inner side shoulder land portion 35 toward both sides thereof in the tire width direction, and steering stability performance on wet road surfaces can be improved. As a result, steering stability performance on dry road surfaces and steering stability performance on wet road surfaces can be improved. Additionally, the protruding amount Hso of the outer side shoulder land portion 34 and the protruding amount Hsi of the inner side shoulder land portion 35 satisfy the relationship of $0.9 \leq Hso/Hsi \leq 1.1$. Accordingly, in the outer side shoulder land portion 34 and the inner side shoulder land portion 35, the ground contact pressure can be prevented from excessively varying. The outer side shoulder land portion 34 and the inner side shoulder land portion 35 provide a good contact with the ground. Thus, the grip force with the road surface can be increased, and steering stability performance on dry road surfaces and steering stability performance on wet road surfaces can be improved.

EXAMPLES

In Examples according to an embodiment of the present invention, performance tests for steering stability performance on dry road surfaces (dry performance) and steering stability performance on wet road surfaces (wet performance) are performed on a plurality of types of pneumatic tires in different conditions (see FIG. 4).

In the performance evaluation tests, pneumatic tires, which are test tires having a nominal size of 225/50R17 98W specified by JATMA, are assembled on specified rims having a rim size of 17×75J, inflated to an internal pressure of 230 kPa, and mounted on all of front and rear wheels of a sedan type test vehicle.

As the evaluation method on steering stability performance on dry road surfaces, the test vehicle is driven on a dry road test surface course, and the specialized test driver has performed a feeling evaluation regarding braking and driving performance, lane changing performance, cornering performance, or the like. Results of the evaluation are expressed as index values and evaluated with Conventional Example being assigned as the reference (100). In this evaluation, larger index values indicate superior steering stability performance on dry road surfaces.

As the evaluation method on steering stability performance on wet road surfaces, the test vehicle is driven on a wet road test surface course, and the specialized test driver has performed a feeling evaluation regarding braking and driving performance, lane changing performance, cornering performance, or the like. Results of the evaluation are expressed as index values and evaluated with Conventional Example being assigned as the reference (100). In this evaluation, larger values indicate superior steering stability performance on wet road surfaces.

In FIG. 4, each of the pneumatic tires of Conventional Example and Examples 1 to 15 has a mounting direction specified with respect to a vehicle. Five land portions are defined and formed in the tire width direction by four circumferential main grooves extending in the tire circumferential direction on the ground contact surface of the tread portion, and thus the tire includes a center land portion on the tire equatorial plane, an outer side middle land portion on the vehicle outer side of the center land portion, an outer side shoulder land portion on the vehicle outer side of the outer side middle land portion, an inner side middle land portion on the vehicle inner side of the center land portion, and an inner side shoulder land portion on the vehicle inner side of the inner side middle land portion.

In the pneumatic tire of Conventional Example, the ground contact surface of each of the land portions is on the reference profile, and the width of each of the land portions is equal. On the other hand, each of the pneumatic tires of Examples 1 to 15 is configured such that the land portion width Wcc of the center land portion and the land portion width Wco of the outer side middle land portion satisfy the relationship of Wcc<Wco, such that the ground contact surface of each of the outer side middle land portion and the outer side shoulder land portion is formed to protrude toward the outer side in the tire radial direction with respect to the reference profile, and such that the protruding amount Hco of the outer side middle land portion and the protruding amount Hso of the outer side shoulder land portion satisfy the relationship of Hcc<Hso.

As can be seen from the test results in FIG. 4, the pneumatic tires of Examples 1 to 15 have improved steering stability performance on dry road surfaces and improved steering stability performance on wet road surfaces.

REFERENCE SIGNS LIST

1 Pneumatic tire
2 Tread portion
3 Shoulder portion
4 Sidewall portion
5 Bead portion
6 Carcass layer
7 Belt layer
7a, 7b Belt
8 Belt reinforcing layer
10 Ground contact surface
15 Bead core
16 Bead filler
20 Circumferential main groove
21 Outer side center main groove
22 Inner side center main groove
23 Outer side shoulder main groove
24 Inner side shoulder main groove
30 Land portion
31 Center land portion
32 Outer side middle land portion
33 Inner side middle land portion
34 Outer side shoulder land portion
35 Inner side shoulder land portion
351 Inner land portion
352 Outer land portion
41, 42, 43, 44, 45 Sipe
51, 52, 53, 54 Lug groove
61 Circumferential narrow groove
CL Tire equatorial plane Hcc Protruding amount of center land portion
Hci Protruding amount of inner side middle land portion
Hco Protruding amount of outer side middle land portion
Hsi Protruding amount of inner side shoulder land portion
Hso Protruding amount of outer side shoulder land portion
P1o, P2o Groove opening end of outer side center main groove
P1i, P2i Groove opening end of inner side center main groove
P3o, P4o Groove opening end of outer side shoulder main groove
P3i, P4i Groove opening end of inner side shoulder main groove
PRcc Reference profile of center land portion
PRco Reference profile of outer side middle land portion
PRso Reference profile of outer side shoulder land portion
PRci Reference profile of inner side middle land portion
PRsi Reference profile of inner side shoulder land portion
T Ground contact edge
Wcc Land portion width of center land portion
Wco Land portion width of outer side middle land portion
Wso Land portion width of outer side shoulder land portion
Wci Land portion width of inner side middle land portion
Wsi Land portion width of inner side shoulder land portion

The invention claimed is:

1. A pneumatic tire comprising a mounting direction specified with respect to a vehicle, the pneumatic tire comprising five land portions in a tire width direction, the five land portions being defined and formed by four circumferential main grooves extending in a tire circumferential direction on a ground contact surface of a tread portion, the five land portions forming a center land portion on a tire equatorial plane, an outer side middle land portion on a vehicle outer side of the center land portion, an outer side shoulder land portion on the vehicle outer side of the outer side middle land portion, an inner side middle land portion on a vehicle inner side of the center land portion, and an inner side shoulder land portion on the vehicle inner side of the inner side middle land portion, the inner side shoulder land portion being divided by a circumferential narrow groove extending continuously in the tire circumferential direction around an entire circumference of the pneumatic tire and having a groove width more narrow than a groove width of any of the four circumferential main grooves, the pneumatic tire comprising a sidewall having an indicator specifying the mounting direction with respect to the vehicle, a land portion width Wcc of the center land portion and a land portion width Wco of the outer side middle land portion satisfying a relationship of Wcc<Wco, the ground contact surface of each of the outer side middle land portion and the outer side shoulder land portion protruding toward an outer side in a tire radial direction with respect to a reference profile, a protruding amount Hco of the outer side middle land portion and a protruding amount Hso of the outer side shoulder land portion satisfying a relationship of Hco<Hso, the protruding amount Hco being greatest closer to a center of the outer side middle land portion than to edges of the outer middle land portion in the tire width direction, and the protruding amount Hso being greatest closer to a center of the outer side shoulder land portion than to edges of the outer side shoulder land portion in the tire width direction, and the ground contact surface of each of the center land portion and the inner side middle land portion being formed to protrude toward the outer side in the tire radial direction with respect to the reference profile.

2. The pneumatic tire according to claim 1, wherein the protruding amount Hco of the outer side middle land portion is in a range of 0.2 mm≤Hco≤0.4 mm.

3. The pneumatic tire according to claim 1, wherein the protruding amount Hso of the outer side shoulder land portion is in a range of 0.3 mm≤Hso≤0.6 mm.

4. The pneumatic tire according to claim 1, wherein the protruding amount Hco of the outer side middle land portion and the protruding amount Hso of the outer side shoulder land portion satisfy a relationship of 1.2≤Hso/Hco≤2.0.

5. The pneumatic tire according to claim 1, wherein
a protruding amount Hcc of the center land portion and the protruding amount Hco of the outer side middle land portion satisfy a relationship of 0.9≤Hcc/Hco≤1.1, and
the protruding amount Hcc of the center land portion and a protruding amount Hci of the inner side middle land portion satisfy a relationship of 0.9≤Hcc/Hci≤1.1.

6. The pneumatic tire according to claim 1, wherein no groove is present on the ground contact surface of the center land portion when in contact with a ground, and
grooves each comprising one end communicating with one of the circumferential main grooves, which is located an outer side in the tire width direction, when in contact with a ground, and the other end terminating within each of the outer side middle land portion and the inner side middle land portion are present on the ground contact surface of each of the outer side middle land portion and the inner side middle land portion.

7. The pneumatic tire according to claim 1, wherein the land portion width Wco of the outer side middle land portion, a land portion width Wso of the outer side shoulder land portion, a land portion width Wci of the inner side middle land portion, and a land portion width Wsi of the inner side shoulder land portion satisfy relationships 1.2≤Wco/Wcc≤1.4, 1.4≤Wso/Wcc≤1.6, 0.9≤Wci/Wcc≤1.1, 1.4≤Wsi/Wcc≤1.6 with respect to the land portion width Wcc of the center land portion.

8. The pneumatic tire according to claim 1, wherein the ground contact surface of the inner side shoulder land portion is formed to protrude toward the outer side in the tire radial direction with respect to a reference profile, and
the protruding amount Hso of the outer side shoulder land portion and a protruding amount Hsi of the inner side shoulder land portion satisfy a relationship of 0.9≤Hso/His≤1.1.

9. The pneumatic tire according to claim 2, wherein the protruding amount Hso of the outer side shoulder land portion is in a range of 0.3 mm≤Hso≤0.6 mm.

10. The pneumatic tire according to claim 9, wherein the protruding amount Hco of the outer side middle land portion and the protruding amount Hso of the outer side shoulder land portion satisfy a relationship of 1.2≤Hso/Hco≤2.0.

11. The pneumatic tire according to claim 10, wherein
a protruding amount Hcc of the center land portion and the protruding amount Hco of the outer side middle land portion satisfy a relationship of 0.9≤Hcc/Hco≤1.1, and the protruding amount Hcc of the center land portion and a protruding amount Hci of the inner side middle land portion satisfy a relationship of 0.9≤Hcc/Hci≤1.1.

12. The pneumatic tire according to claim 11, wherein no groove is present on the ground contact surface of the center land portion when in contact with a ground, and grooves each comprising one end communicating with one of the circumferential main grooves, which is located an outer side in the tire width direction, when in contact with a ground, and the other end terminating within each of the outer side middle land portion and the inner side middle land portion are present on the ground contact surface of each of the outer side middle land portion and the inner side middle land portion.

13. The pneumatic tire according to claim 12, wherein the land portion width Wco of the outer side middle land portion, a land portion width Wso of the outer side shoulder land portion, a land portion width Wci of the inner side middle land portion, and a land portion width Wsi of the inner side shoulder land portion satisfy relationships $1.2 \leq Wco/Wcc \leq 1.4$, $1.4 \leq Wso/Wcc \leq 1.6$, $0.9 \leq Wci/Wcc \leq 1.1$, $1.4 \leq Wsi/Wcc \leq 1.6$ with respect to the land portion width Wcc of the center land portion.

14. The pneumatic tire according to claim 13, wherein the ground contact surface of the inner side shoulder land portion is formed to protrude toward the outer side in the tire radial direction with respect to a reference profile, and the protruding amount Hso of the outer side shoulder land portion and a protruding amount Hsi of the inner side shoulder land portion satisfy a relationship of $0.9 \leq Hso/Hsi \leq 1.1$.

* * * * *